E. R. GILL.
SELECTIVE SIGNALING SYSTEM.
APPLICATION FILED AUG. 26, 1912.
Reissued Nov. 16, 1915. 14,010.
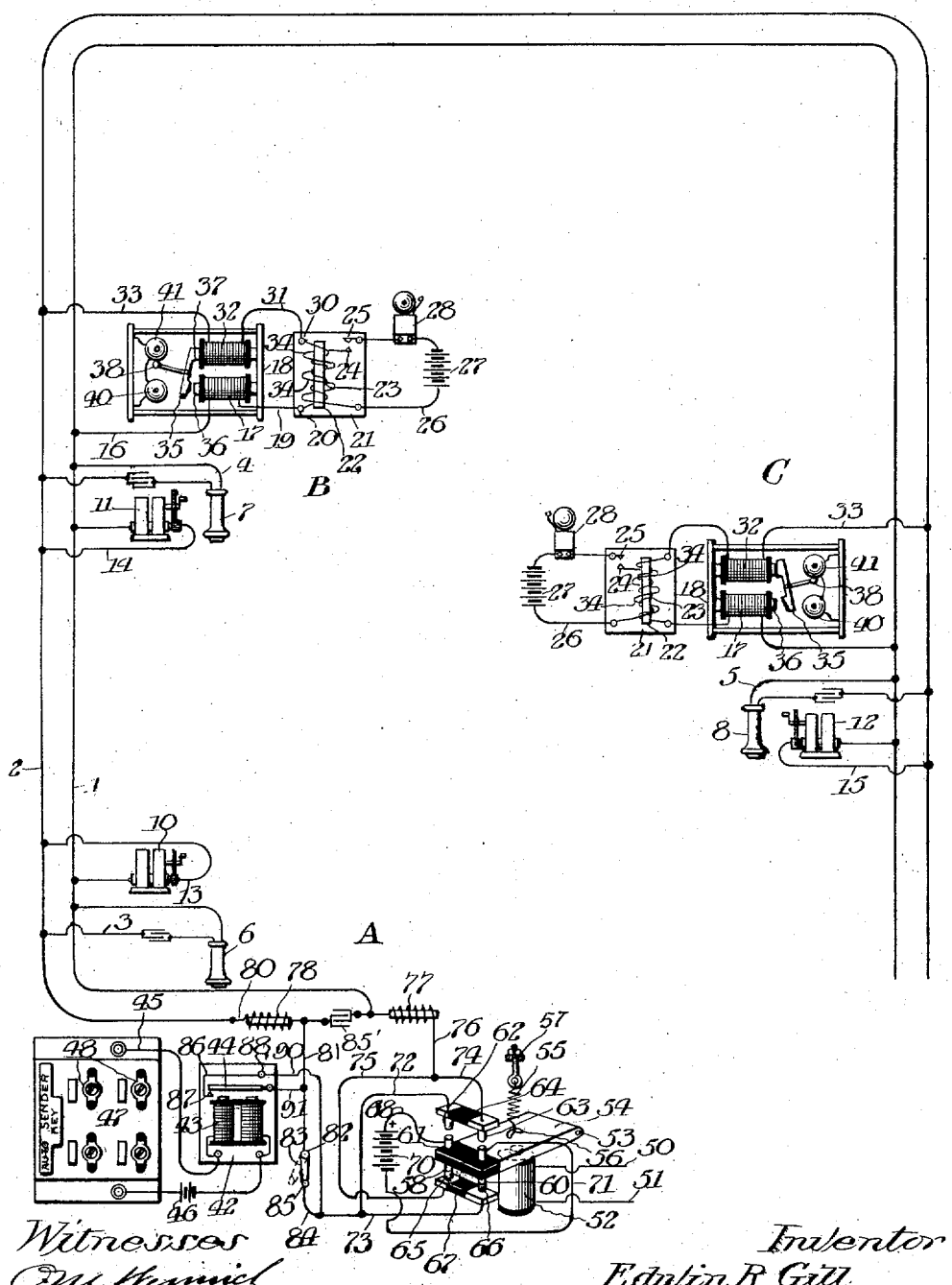
Witnesses
O. M. Hennick
A. L. Jones.
Inventor
Edwin R. Gill
by Max W. Zabel
Atty.

UNITED STATES PATENT OFFICE.

EDWIN R. GILL, OF YONKERS, NEW YORK, ASSIGNOR, BY MESNE ASSIGNMENTS, TO HALL SWITCH & SIGNAL COMPANY, A CORPORATION OF MAINE.

SELECTIVE SIGNALING SYSTEM.

14,010. Specification of Reissued Letters Patent. Reissued Nov. 16, 1915.

Original No. 1,020,975, dated March 26, 1912, Serial No. 532,052. Application for reissue filed August 26, 1912. Serial No. 717,225.

*To all whom it may concern:*

Be it known that I, EDWIN R. GILL, a citizen of the United States, residing in the city of Yonkers, county of Westchester, and State of New York, have invented a certain new and useful Improvement in Selective Signaling Systems, of which the following is a specification.

This invention relates to signaling systems, and more particularly to such systems as are adaptable to telephonic train despatching circuits.

One of the objects of the present invention is to provide a convenient method of communicating the correct time simultaneously to various despatchers along a telephone train despatching circuit.

Another object is to provide means whereby signals arranged in a telephonic despatching circuit may be operated in consonance with electrical impulses impressed upon a telegraph circuit from the National Observatory or other sending station, thereby enabling the time piece of each despatcher to be periodically standardized.

Other objects will be in part obvious and in part pointed out hereinafter.

The invention accordingly consists in the features of construction, combinations of elements and arrangement of parts, which will be exemplified in the construction hereinafter described, and the scope of the application of which will be indicated in the following claims.

A system embodying my invention is disclosed and represented diagrammatically in the drawing attached hereto and forming a part of this specification.

Referring now to the drawings, the view may be said to illustrate diagrammatically the signaling apparatus, wiring and operating device in the principal train depatcher's station as well as receiving stations of a telephonic train despatcher's circuit, said stations being designated, respectively A, B and C.

1 and 2 respectively, denote opposite sides of the main telephone line, and connected in bridge thereof as indicated at 3, 4 and 5 are telephones 6, 7, and 8. Calling devices for the various telephones along the line are provided in each of the stations, said calling devices in the present instance comprising magnetos 10, 11 and 12, each magneto being located in a normally open bridge of the telephone line, said bridges being indicated at 13, 14 and 15.

The signaling devices and other operating mechanism in each of the receiving stations being similar, but one set thereof need be described in order to impart a clear understanding of the present invention.

Leading from wire 1 of the telephone line is a wire 16 which connects with one terminal of the coil 17 positioned upon one leg of the magnet, the yoke of which is shown at 18 and leading from the other terminal of said coil is a wire 19. This wire leads to a terminal 20 of the selector, illustrated diagrammatically at 21. This selector which is preferably a structure such as is described in Letters Patent, No. 906,523, issued to me December 15, 1908, includes a magnet 22 and a coil 23 on said magnet, the latter being connected with the terminal 20. Magnet 22 is adapted to operate mechanism (not shown) which causes a contact member 24 to engage an opposed contact member 25 and close local circuit 26. Included in local circuit 26, in the present instance, is a battery 27 and a signal 28 which signal may take the form of an ordinary electric bell. Coil 23 is connected with the terminal 30 of the selector, and from this terminal leads a wire 31 to the terminal of a coil 32 positioned upon the other leg of the magnet 18. From the opposite terminal of this coil leads a wire 33 to the opposite side 2 of the telephone line. It will thus be seen that the coils 17 and 32 of the magnet 18 as well as selector 21 are connected in bridge of the telephone line. If desired, a portion of the local circuit 26 may include a coil 34 positioned upon magnet 22 so that when the local circuit 26 is closed by the selector 21 and induced current will be set up in the main line, the effect of which will be a buzzing in the various telephone receivers along the telephone line. This buzzing, which constitutes an "answer back" signal, will inform the operator that the local signal operating circuit has been closed by the operation of the selector.

35 denotes a polarized armature which cooperates with the poles 36, 37 of the magnet 18. Armature 35 is provided with a clapper 38 which is adapted to co-act with the bells 40, 41 to sound a signal.

42 indicates a relay comprising coils 43 and an armature 44. The coils 43 of this relay are included in a local circuit 45 which is provided with the battery 46, and included in this local circuit is a sender key 47 having operating keys 48. These keys, when operated, actuate mechanism (not shown) to impress impulses of a predetermined character upon the local circuit 45, thereby operating the relay 42.

50 and 51 indicate the opposite sides of the telegraph line, which lead into the train despatcher's station. These wires include a coil 52 of a relay 53 having an armature 54. Armature 54 is normally urged to movement in an upward direction as by means of the retractile spring 55 connected thereto at 56 with the fixed support 57. Contact members 58 and 60 extend through an insulating block 61 carried by the armature 54. The upper ends of said contact members are adapted to coöperate respectively with opposed contact members 62 and 63 which are insulated from each other as by means of the block 64. The lower ends of contact members 58 and 60 are adapted to coöperate respectively with opposed contact members 65 and 66 which are also insulated from each other as by means of the block 67. A wire 68 leads from the positive side of the battery 70 to the contact member 58 and a wire 71 leads from the contact member 60 to the negative side of the battery 70. Contact members 62 and 66 are connected as by the wires 72 and 73, and contact members 63 and 65 are connected as by means of the wires 74 and 75. A wire 76 leads from the point of jointure of wires 74 and 75 to the side A of the telephone line and included in this wire is a retardation or choke coil 77.

78 indicates a choke coil included in a wire 80 which leads from the side 2 of the telephone line to a wire 81, the latter being connected with a terminal 82 of a switch 83 and a wire 84 leads from the other terminal 85 of the switch to the point of jointure of wires 72 and 73, a condenser 85 being interposed between the point of jointure of wires 80 and 81 and the side 1 of the telephone line. A wire 86 leads from the opposed contact 87 of the armature 44 of the relay 42 to a terminal 88 of the relay, and from this terminal a wire 90 leads to the wire 84. The armature 44 of the relay 42 is connected with wire 81 as by means of the wire 91.

Having thus described this embodiment of my invention, the operation thereof may now be understood. When the switch arm 83 is in the position shown in the drawing, the system is put into such condition that the various polarized signals along the line may be operated by impulses impressed upon the telephone line by the battery 70 in accordance with the operation of the relay 53. This relay, as above described, is operated by impulses impressed upon the telegraph line, the sides of which are indicated at 50 and 51. The impulses which are sent over the telegraph line are impressed thereon from the National Observatory at a predetermined time, the object of the invention as above stated being to enable the time pieces of the various operators along the line to be periodically standardized.

It will be understood that during the impression of the impulses upon the telegraph line, the armature 54 of relay 53 will oscillate between the opposed sets of contacts. Assuming the armature 54 to be in the position shown in the drawings, impulses will be impressed upon the telephone line from the battery 70 to actuate the polarized signals according to the following circuit: wire 68, contact member 58, contact member 65, wire 75, wire 76, impedance coil 77 to the side 1 of the telephone line, thence through wire 16, then through coil 17, wire 19, coil 23, wire 31, coil 32, wire 33 to the opposite side 2 of the telephone line, thence through wire 80, impedance coil 78, wire 81, switch arm 83, wire 84, wire 73, contact member 66, contact member 60 and wire 71 to the opposite side of the battery 70. When the armature 54 is in engagement with the upper side of contact members 62 and 63, impulses are impressed upon the telephone line to actuate the polarized signals through the following circuit: wire 68, contact member 58, contact member 62, wire 72, wire 84, switch arm 83, wire 81, impedance coil 78, wire 80 to the side 2 of the telephone line, whence they pass in an opposite direction through the various apparatus in bridge thereof, thence they return through side 1 and through impedance coil 77, wire 76, wire 74, contact member 63, contact member 60 and wire 71 to the negative side of the battery. Thus it will be seen that the oscillatory movements of the relay 53 will close such circuits as will enable battery 70 to impress impulses alternately in opposite directions to the telephone line, whereby the polarized armatures of the various receiving instruments will be actuated in consonance with the impulses impressed upon the telegraph line from the National Observatory.

When it is desired to set the system for selective signaling, the switch arm 83 is moved to the position shown in dotted lines, and, assuming the armature 54 to be in the position shown, the manipulation of any of the sender keys 48 will, through local circuit 45 and relay 42, cause battery 70 to impress impulses upon the line according to the following circuit: from battery 70 through wire 68 to contact member 58, thence through contact member 65, wire 75, wire 76, coil 77 to the side 1 of the telephone line, then through wire 16 to the coils of the polarized signal apparatus and the coil 23 of the selector as has been heretofore set forth, the current returning by means of the wire 33 to the opposite side 2 of the telephone line, whence it passes through wire 80, impedance coil 78, wire 81, wire 91 to the armature 44 of the relay 42, thence through wire 86, wire 90, wire 73, contact member 66, contact member 60 and wire 71 to the opposite side of the battery 70. It will be understood that a similar circuit, but in an opposite direction will be impressed upon the telephone when the armature 54 occupies its normal position with contact members 58 and 60 in engagement with contact members 62 and 63. Upon the impression of impulses of a predetermined character upon the last described circuit, the local circuits 26 in the particular station called will be closed by the engagement of the opposed contacts 24 and 25, through the action of the selector. When it is desired to call the various telephones in the receiving stations or the one in the calling station, such operation may be effected as by means of the magnetos 10, 11 and 12 which as above described are in a normally open bridge of the telephone line.

It will accordingly be seen that I have provided an improved signaling system adapted to attain among others all the ends and objects pointed out in an exceedingly simple yet efficient manner.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense. It is also to be understood that the language used in the following claims is intended to cover all of the generic and specific features of the invention herein described and all statements of the scope of the invention, which as a matter of language, might be said to fall therebetween.

Having described my invention what I claim as new and desire to secure by Letters Patent is:

1. In a signaling system, in combination, a telephone line, a polarized signaling device in bridge of said line, current supplying means in said line, a telegraph line, and means actuated by impulses impressed upon said telegraph line for applying said current supplying means to said telephone line so that the current will flow therethrough alternately in opposite directions.

2. In a signaling system, in combination, a telephone line, a polarized signaling device in bridge of said line, a battery adapted to be applied to said telephone line, a telegraph line, and a current reversing relay actuated by impulses impressed upon the telegraph line for applying said battery to said telephone line whereby said signaling device will be actuated in consonance with the impulses impressed upon the telegraph line.

3. In a signaling system, in combination, a telephone line, a polarized signaling device in bridge of the same, current supplying means adapted to be connected with said telephone line, a telegraph line, and means actuated by impulses impressed upon the telegraph line for applying said current supplying means to the telephone line and for changing the polarity thereof with respect to said line whereby said polarized signaling devices will be operated.

4. In a signaling system, in combination, a telephone line, a polarized signaling device in bridge of said line, a battery adapted to be applied to said line, a telegraph line, and a pole changing relay actuated by impulses impressed upon the telegraph line for applying said battery to said telephone line.

5. In a signaling system, in combination, a telephone line, a polarized signaling device in bridge of said line, a selector in said bridge, a local circuit including a battery and a signaling device adapted to be closed by said selector, a battery adapted to be applied to said telephone line, a relay adapted to apply the battery to said line, a local circuit including a sender key for operating said relay, a telegraph line, a relay actuated by impulses impressed upon the telegraph line for applying said battery to said line and for alternately reversing the polarity of said battery with respect to the line, and means for rendering said first mentioned relay ineffective.

6. A signaling system comprising a calling station and a plurality of receiving stations disposed along a telephone line, a polarized signaling device in bridge of the telephone line located in each of the receiving stations, a battery adapted to be applied to the telephone line, and a telegraphically operated pole changing relay located in the calling station adapted to apply said battery to said telephone line.

7. A signaling system comprising a calling station and a plurality of receiving stations disposed along a telephone line, a selectively operated signal in each of the receiving stations, means in the calling station for selectively calling said receiving stations, a polarized signal in each of the receiving stations, a battery adapted to be applied to the telephone line, and a pole changing relay adapted to be actuated by impulses impressed upon the telegraph line for applying said battery to said telephone line whereby said polarized signaling device will be operated simultaneously and in consonance with the impulses impressed upon the telegraph line.

8. A signaling system comprising a calling station and one or more receiving stations disposed along a telephone line, a selector in each of the receiving stations connected in bridge of the telephone line, a local circuit comprising a battery and a signal adapted to be closed by each selector, a polarized signaling device in each of the receiving devices and connected in bridge of the telephone line, a telephone in each of said stations, means in each of said stations in a normally open bridge of the line for operating the calling means of the telephones in each of the other stations, means in the calling stations for operating the selector in each of the receiving stations, a battery adapted to be applied to the telephone line, a telegraph line, and a relay actuated by impulses impressed upon the telegraph line for applying said battery to said telephone line and for alternatively reversing the polarity thereof with respect to said line whereby the polarized signaling device in the receiving stations will be operated simultaneously.

9. In a signaling system, in combination, a telephone line, a polarized signaling device in bridge of said line, a main telegraph line, and means including a relay for connecting said telephone and telegraph lines whereby said signaling device will be operated by electrical impulses impressed upon the telegraph line.

10. In a signaling system, in combination, a telephone line, a polarized signaling device in bridge of the same, a local circuit connected across said telephone line, current supplying means in said local circuit, a main telegraph line, and a relay interposed between said local circuit and said telegraph line adapted to be operated by electrical impulses impressed upon the telegraph line whereby said polarized signal will be operated.

11. In a signaling system, in combination, a telephone line, a polarized signaling device in bridge of the same, a local circuit connected across said line, current supplying means in said local circuit, a main telegraph line, a relay interposed between said local circuit and said telegraph line and adapted to be operated by electrical impulses impressed upon the latter, and means in said local circuit for impressing current in opposite directions therein when said relay is operated, thereby operating said polarized signaling device.

12. In a signaling system, in combination, a telephone line, a polarized signaling device in bridge of the same, a local circuit connected across said line, current supplying means in said local circuit, a main telegraph line, a relay interposed between said local circuit and said telegraph line and adapted to be operated by electrical impulses impressed upon the latter, and means in said local circuit for impressing current in opposite directions therein when said relay is operated, thereby operating said polarized signaling device, the direction in which the current is impressed on said local circuit being determined by the position of the armature of said relay relative to its contacts.

13. In a signaling system, in combination, a telephone line, a signaling device in bridge of said line, a telegraph line, a local circuit connected to opposite sides of the telephone line, a relay in said local circuit adapted to be operated by electrical impulses impressed on the telegraph line, and means in said local circuit adapted, when said relay is operated, to actuate said signaling device in consonance with the impulses impressed on the telegraph line.

14. In a signaling system, in combination, a telephone line, a selective signaling device in bridge of said line, a second signaling device in said bridge, a plurality of local circuits connected to opposite sides of said telephone line, a common source of current supply for said local circuits, a local circuit including a source of current supply and a sender key, a relay operated by impulses impressed upon said last named local circuit adapted to close one of said first named local circuits whereby said selective signaling device will be actuated, a telegraph line, a relay in the other of said first named local circuits adapted to be operated by electrical impulses impressed upon the telegraph line, and means in said last mentioned circuit for impressing current thereon consonantly with the impression of impulses on the telegraph line whereby said second signaling device will be operated.

15. In a signaling system, in combination, a telephone line, a selective signaling apparatus in bridge of the line, a polarized signaling apparatus in said bridge, a plurality of local circuits connected to opposite sides of the telephone line, each of said local circuits being provided with a source of current supply, means for closing one of said local circuits whereby said selective signaling apparatus will be operated, means for closing the other of said local circuits, and means in said last named circuit for impressing currents alternately in opposite directions therein whereby said polarized signaling device will be operated.

16. In a signaling system, in combination, a telephone line, a selective signaling device in bridge of said line, a second signaling device in said bridge, a plurality of local circuits having a common connection to opposite sides of said telephone line, a source of current supply common to said local circuits, a local circuit including a source of current supply and a sender key, a relay operated by impulses impressed upon said last named circuit adapted so close one of said first named local circuits whereby said selective signaling device will be actuated, a telegraph line, a relay in the other of said first named local circuits adapted to be operated by electrical impulses impressed upon the telegraph line, and means in said last mentioned circuit for impressing current therein in opposite directions consonantly with the impression of impulses on the telegraph line whereby said second signaling device will be operated.

17. In a signaling system, in combination, a telephone line, selective signaling apparatus in bridge of the line, a polarized signaling apparatus in said bridge, a plurality of local circuits having a common connection with opposite sides of the telephone line, a source of current supply common to said local circuits, means for closing one of said local circuits whereby said selective signaling apparatus will be operated, impedance means in said last mentioned local circuit, a telegraph line, and means actuated by impulses impressed upon the telegraph line for causing impulses to be impressed alternately in opposite directions upon the other of said local circuits, whereby said polarized signaling device will be operated.

18. In a signaling system, the combination of a main and a plurality of substations, a main line uniting said stations, signaling means at the substations for giving a protracted signal and a single stroke signal, a selector at each substation, said signaling means being adapted to respond selectively to any polarity to give a protracted signal, and adapted to respond simultaneously at all the substations to reversals of polarity only to give a single stroke signal.

19. A system of the character described having a signal-sending and signal-receiving stations united by a line circuit, a step-by-step signal controlling device at each receiving station associated with said line circuit, a signal under the control of each device, a single stroke signal at each receiving station associated with said line circuit, means associated with said signals whereby either may be operated to the exclusion of the other and means at the central station for selectively impressing current on said line circuit to operate either signal to the exclusion of the other.

20. A system of the character discribed having a signal sending and signal receiving stations united by a line circuit, a step-by-step signal controlling device at each receiving station associated with said line circuit, a signal adapted for protracted operation under the control of each device, a second signal adapted for single stroke operation at each receiving station associated with said line circuit, means associated with said signals whereby either may be operated to the exclusion of the other and means at the central station for selectively impressing current on said line circuit to operate either signal to the exclusion of the other.

21. A system of the character described having a signal sending and signal receiving stations united by a common line circuit, a signal for each station adapted for protracted signaling controlled over said circuit, a signal adapted for single stroke action at each station controlled over said line circuit, means associated with said signals whereby either may be operated to the exclusion of the other and means at the central station to control the operation of either signal.

22. In a selective signal system, the combination of a main and a plurality of substations, a main line uniting said stations, a selector at each substation associated with said line, a signal adapted for protracted operation under the control of each selector, a second signal associated with said line at each substation adapted for single stroke operation and responsive for a complete signal to impulses of characteristic different from that for operating said selectors and means at the main station for impressing on said main line impulses for operating both signals.

23. A signal system comprising a signal-sending station and signal receiving-stations, a line circuit uniting said stations, telephones on said line for communication between any one of said stations and any other station on said line, a step-by-step signaling apparatus in bridge of said line at each receiving station having means to give both a protracted vibratory signal and a single stroke time signal, a time circuit at the sending station and means at the sending station to control over said line circuit said apparatus to give a selective protracted vibratory signaling indication at one of said receiving stations, or to give single stroke time signals simultaneously at all the receiving stations corresponding to impulses in said time circuit.

24. A signal system comprising a signal-sending station and signal-receiving stations, a line circuit uniting said stations, telephones on said line for communication between any one of said stations and any other station, signaling apparatus including a step-by-step device in bridge of said line circuit at each receiving station having means to give both a protracted vibratory signal and a single stroke time signal, a time circuit at the sending station and means at the sending station to control over said line circuit said apparatus to give a selective protracted vibratory signaling indication or to give single stroke time signals corresponding to impulses transmitted from the time circuit through the sending station but without operatively setting said step-by-step element.

25. A signal system comprising a main signal station and a plurality of substations, a line circuit uniting said stations, telephones at all the stations adapted for communication therebetween, a signal apparatus including a step-by-step device at each substation having means to give both a protracted vibratory signal and a single stroke signal over the same line circuit, a time circuit at the sending station, means at the sending station for selectively calling over said line circuit a given station to give a protracted signal thereat and means at the sending station for controlling the substation signaling means whereby a single stroke signal is given over said line circuit at all the substations simultaneously in synchronism with impulses in said time circuit.

26. In a signal system, the combination of a main station and a plurality of substations, a main line uniting said stations, telephones at all the stations for communication by the central station with any one of the substations, signaling apparatus on said line at each substation having means to give a selective protracted signaling indication and a single stroke time signal in response to impulses on said main line, a time circuit at the main station, means at the main station for controlling over said line circuit the signaling apparatus to give a selective signal at any station and for giving a single stroke time signal simultaneously at all the substations and means whereby the signals may be controlled and telephone conversation had over the entire length of said main line simultaneously without interference.

In witness whereof, I hereunto subscribe my name this 8 day of August, 1912.

EDWIN R. GILL.

Witnesses:
CHARLES S. RHOADS, JR.,
JOHN W. BARNEY.

Copies of this patent may be obtained for five cents each, by addressing the "Commissioner of Patents, Washington, D. C."